No. 815,581. PATENTED MAR. 20, 1906.
M. DEAN.
UNION FOR PIPES.
APPLICATION FILED SEPT. 10, 1904.
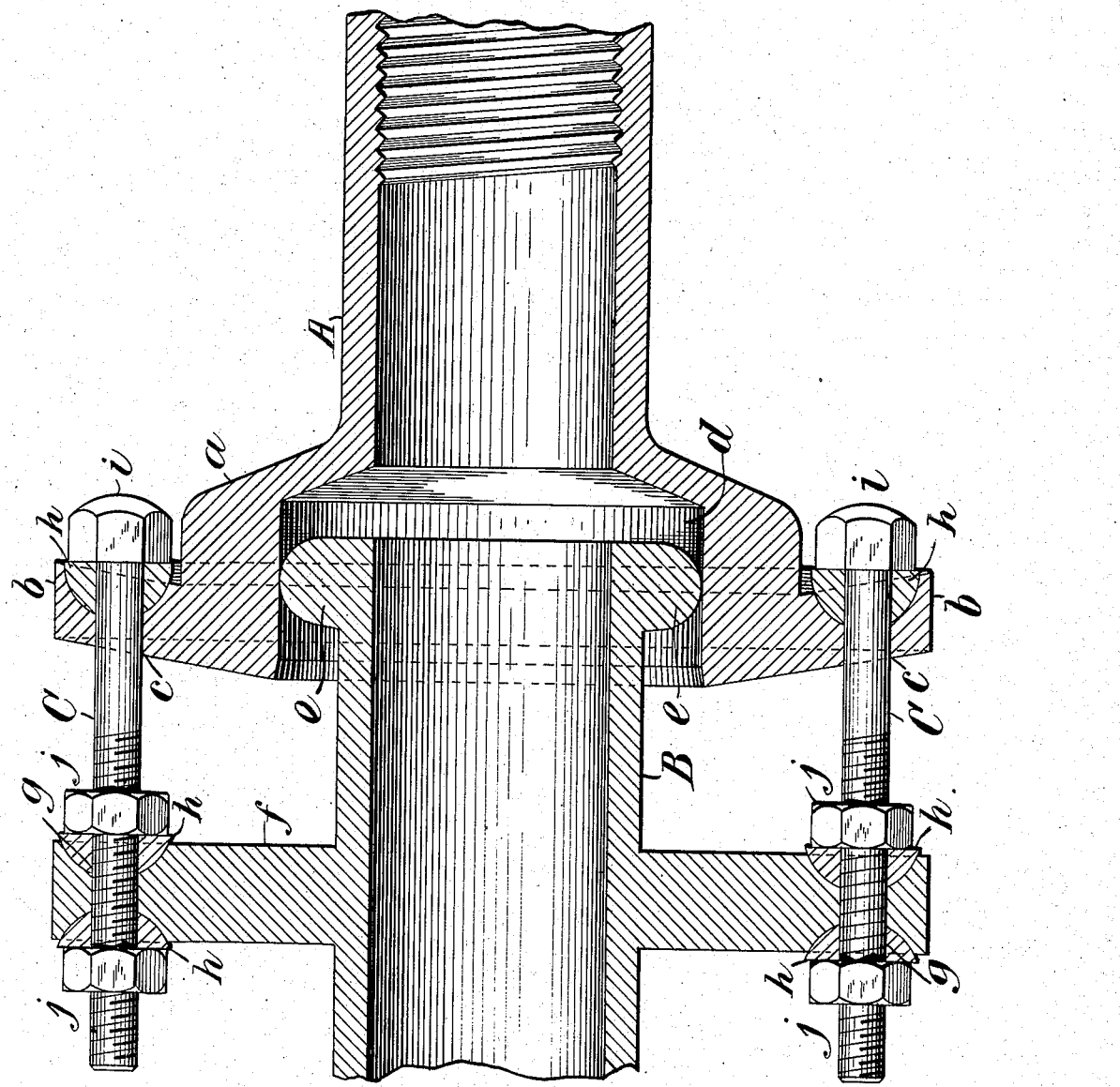
Witnesses
Mark Dean, Inventor
By his Attorney

UNITED STATES PATENT OFFICE.

MARK DEAN, OF EAST ORANGE, NEW JERSEY.

UNION FOR PIPES.

No. 815,581.   Specification of Letters Patent.   Patented March 20, 1906.

Application filed September 10, 1904. Serial No. 223,960.

*To all whom it may concern:*

Be it known that I, MARK DEAN, a citizen of the United States, and a resident of East Orange, in the county of Essex and State of New Jersey, have invented certain new and useful Improvements in Unions for Pipes, of which the following is a specification.

The object of my invention is to provide an adjustable union for pipes whereby connection can be made between pipes which are separated from each other by an intervening space which cannot readily be filled by a simple pipe length. Such spaces occur frequently in laying iron pipe, both in underground work and otherwise. My improved union can also be used as an extension or a deflecting joint in the continuous laying of pipe. To accomplish this object, I provide two pieces of pipe, preferably of cast-iron, with their outer ends screw-threaded internally or externally or flanged, tapered, or hubbed, as may be required to fit the pipe lengths with which they are to be coupled and which they join together. The other or meeting end of one of these pipes is provided with a hub, from which projects a flange or a series of lugs, as preferred. The hubbed end is recessed to allow the end of the other piece to enter. The end of the other piece has an annular flange at or near its extreme end designed to enter the recess of the hubbed piece and is also provided with a suitable flange some distance back from the end and not adapted to enter the hubbed recess, but intended to be drawn by suitable means toward the flange of the pipe.

Various forms of hubs, flanges, and recesses might be adopted; but the form which I prefer is shown in the accompanying drawing, in which—

A represents a short piece of pipe, the end being shown as broken off. This piece of pipe is shown as provided with a hub $a$, the outer periphery of which is enlarged to form a flange $b$, provided with suitable bolt-holes $c$. The hub has a cylindrical recess $d$, adapted to receive the end of the other pipe. B represents another short piece of pipe, the end being shown as broken off. The entering end of this pipe is provided with an annular flange $e$, the outer edge of which is convex, as shown, and slightly larger than the diameter of the recess, so that force has to be applied to drive the pipe into the recess of the hub. Some distance back from this flanged end is a larger flange $f$, provided with bolt-holes $g$. The bolt-holes $c g$ are countersunk, as shown, to receive the hemispherical washers $h$. C C are the bolts by which the flanges $b f$ are drawn together, each being provided with a head $i$ and two nuts $j j$. In coupling the union composed of this hub and this flanged end of pipe together to connect two pipe lengths already laid the flange-pipe B is forced into the cylindrical recess in the end of the pipe A sufficiently to make a tight joint between the convex flange $e$ and the interior wall of the recess, the outer ends of the pipes being connected with the two pipes to be joined. The union is then made perfect by drawing the flange farther in the recess, forcing it toward the mouth of the recess by turning the screw-bolts either to the right or left, according to whether the union has to be lengthened or shortened. In addition to this adjustable feature it is obvious that the union can also be used as a deflecting-joint where a pipe at one level or direction has to be continued at a slightly-different level or angle. The edge of the flange $e$ being convex makes a perfect joint, whether the pipe is straight or at an angle.

I claim—

An adjustable union for pipes which consists of two portions of pipe, one of which has a hub with a cylindrical recess, and the other of which is provided with a convex flange adapted to be forced into said recess and to make a tight joint therewith at any point of the interior and at a variable angle thereto and means substantially as described whereby the length of said union may be varied by drawing said flange into said recess to various distances without interfering with the tightness of the joint.

MARK DEAN.

Witnesses:
G. SCHUMACHER,
W. P. PREBLE, Jr.